United States Patent
Yamamoto et al.

(10) Patent No.: US 8,794,982 B2
(45) Date of Patent: Aug. 5, 2014

(54) ELECTRIC JUNCTION BOX

(71) Applicant: Yazaki Corporation, Tokyo (JP)

(72) Inventors: Masaki Yamamoto, Makinohara (JP);
Kazutoshi Kurachi, Makinohara (JP);
Kei Tomita, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/928,678

(22) Filed: Jun. 27, 2013

(65) Prior Publication Data
US 2014/0045351 A1    Feb. 13, 2014

(30) Foreign Application Priority Data
Aug. 10, 2012   (JP) .................................. 2012-177900

(51) Int. Cl.
| H01R 12/00 | (2006.01) |
| H01R 9/24 | (2006.01) |
| H01R 9/22 | (2006.01) |

(52) U.S. Cl.
CPC .............. H01R 9/2458 (2013.01); H01R 9/226 (2013.01); *Y10S 439/949* (2013.01)
USPC ......................................... 439/76.2; 439/949

(58) Field of Classification Search
USPC ......................................... 439/76.2, 719, 949
See application file for complete search history.

(56) References Cited

U.S. PATENT DOCUMENTS

| 7,549,872 B2 * | 6/2009 | Akahori et al. ............... 439/76.2 |
| 8,563,862 B2 * | 10/2013 | Mochizuki .................. 174/84 C |
| 8,641,430 B2 * | 2/2014 | I et al. .......................... 439/76.2 |

FOREIGN PATENT DOCUMENTS

JP         2005-019259 A      1/2005

* cited by examiner

*Primary Examiner* — Neil Abrams
*Assistant Examiner* — Travis Chambers
(74) *Attorney, Agent, or Firm* — Edwards Wildman Palmer LLP

(57) ABSTRACT

Disclosed is an electric junction box capable of preventing an electric wire from entering into a second housing and contacting with an electric wire crimped part, and of allowing a bus bar smoothly to insert into a frame. The electric wire includes a frame and a bus bar. The bus bar includes a plate part, a plurality of terminals projecting in parallel with each other from one end of the plate, and an electric wire crimped part projecting from the other end of the plate. The frame includes a first housing accommodating the plate part and the plurality of terminals, and a second housing projecting from an end of the first housing and accommodating the electric wire crimped part. A tubular peripheral wall composing the second housing includes a slit passing the bus bar therethrough upon the bus bar being inserted into the frame.

4 Claims, 8 Drawing Sheets

ELECTRIC JUNCTION BOX

CROSS REFERENCE TO RELATED APPLICATION

This application is on the basis of Japanese Patent Application NO. 2012-177900, the contents of which are hereby incorporated by reference.

TECHNICAL FIELD

This invention relates to electric junction boxes including bus bars provided with electric wire crimped parts and frames accommodating the bus bars.

BACKGROUND ART

Electric junction boxes for automobiles include various configurations, for example, those including bus bars provided with electric wire crimped parts and frames accommodating bus bars (see PTL 1 for example). FIG. 7 is an exploded view illustrating a conventional electric junction box including a bus bar provided with a electric wire crimped part and a frame accommodating the bus bar, and FIG. 8 is an explanatory view illustrating drawback of the electric junction box shown in FIG. 7.

As shown in FIG. 7, the electric junction box 301 is provided with a bus bar 3 made of metal plate, and a frame 302 made of synthetic resin.

The bus bar 3 is provided with a plane part 4, a plurality of terminals 5 projecting from one end in a short width direction of the plane part 4 in parallel with each other, an electric wire crimped part 7 projecting from the other end in the short width direction of the plane part 4, and a terminal protection part 6 projecting from both ends in a long width direction of the plane part 4 along the same direction as the terminals 5. The terminals 5 include a pair of holders 50 holding mating members therebetween (e.g., a terminal of a fuse) and are formed into tuning fork shape. The terminal protection part 6 has a latching hole 8 formed for latching a lance provided inside the frame 302. This bus bar 3 is inserted into the frame 302 in a arrow A direction in FIG. 7 with electric wire being connected with the electric wire crimped part 7.

CITATION LIST

Patent Literature

[PTL 1]
Japanese Patent Application Laid-Open Publication No. 2005-19259

SUMMARY OF INVENTION

Technical Problem

Disadvantageously, there were two drawbacks in the above-mentioned electric junction box 301. The first drawback is that as shown in FIG. 8 the electric wire 9 may be bitten in a slit 311 of a second housing 322 so as to contact the electric wire crimped part 7, a cover of the electric wire 9 is torn to short. Note that the electric wire 9 differs from one (not shown) that is connected with the electric wire crimped part 7. The second drawback is that when the bus bar 3 is inserted into the frame 302 a part facing the slit 311 of a peripheral wall 310 may likely be stuck within a space such as between the terminals 5 or the pair of holders 50, causing ill workability of insertion of the bus bar 3.

Therefore, an object of the present invention is to provide an electric junction box allowing for prevention of the electric wire entering in the second housing and its contact with the electric wire crimped part, and for smooth insertion of the bus bar into the frame.

Solution to Problem

According to one aspect of the invention to achieve the above mentioned object, there is provided an electric junction box, comprising: a bus bar including a plate part, a plurality of terminals projecting in parallel with each other from one end of the plate, and an electric wire crimped part projecting from the other end of the plate; and a frame accommodating the bus bar and including a first housing accommodating the plate part and the plurality of terminals, and a second housing projecting from an end of the first housing and accommodating the electric wire crimped part, the second housing including a tubular peripheral wall composing the second housing and being provided with a slit passing the bus bar therethrough upon the bus bar being inserted into the frame, and a bite prevention wall upstanding from both sides of the slit in an outward direction of the second housing.

Preferably, the terminals include a pair of holders holding a connection mating member therebetween and are formed into tuning fork shape, and wherein an upstand length of the bite prevention wall from the peripheral wall is arranged larger than an interval between the pair of holders.

Preferably, the upstand length of the bite prevention wall from the peripheral wall is arranged larger than an interval between the terminals adjacent to each other.

Advantageous Effects of Invention

According to the one aspect of the invention, since the bite prevention walls upstand from the both ends of the slit of the peripheral wall toward the outside of the second housing, a distance between the bite prevention wall and the electric wire crimped part of the second housing is arranged large even though electric wire entering into between the pair of bite prevention walls, allowing for prevention of the electric wire from contacting with the electric wire crimped part. Furthermore, since the bus bar, when inserted into the frame, is inserted into in position after alignment, such as is slid while abutted onto the bite prevention wall, it is made possible smoothly to insert the bus bar into the frame without being stuck.

Furthermore, since the terminals include the pair of holders holding the mating member therebetween and are formed into tuning fork shape, and wherein the upstand length of the bite prevention wall from the peripheral wall is arranged larger than the interval between the pair of holders, it is made possible reliably to prevent the bite prevention wall from being bitten between the pair of holders when the bus bar is inserted into the frame and smoothly to insert the bus bar into the frame without being stuck.

Furthermore, since the upstand length of the bite prevention wall from the peripheral wall is arranged larger than the interval between the terminals adjacent to each other, it is also made possible reliably to prevent the bite prevention wall from being bitten between the pair of holders when the bus bar is inserted into the frame and smoothly to insert the bus bar into the frame without being stuck.

DESCRIPTION OF EMBODIMENTS

With reference now to FIGS. 1 to 4 discussed is "an electric junction box" according to the invention. "The electric junction box" is what is mounted in an automobile, and supplies power and transmits signals to electric devices mounted in the automobile. Herein, a junction block (also referred to as a junction box), a fuse block (referred to as a fuse box), a relay block (referred to as a relay box) are collectively referred to as an electric junction box hereinafter.

Figure 1:
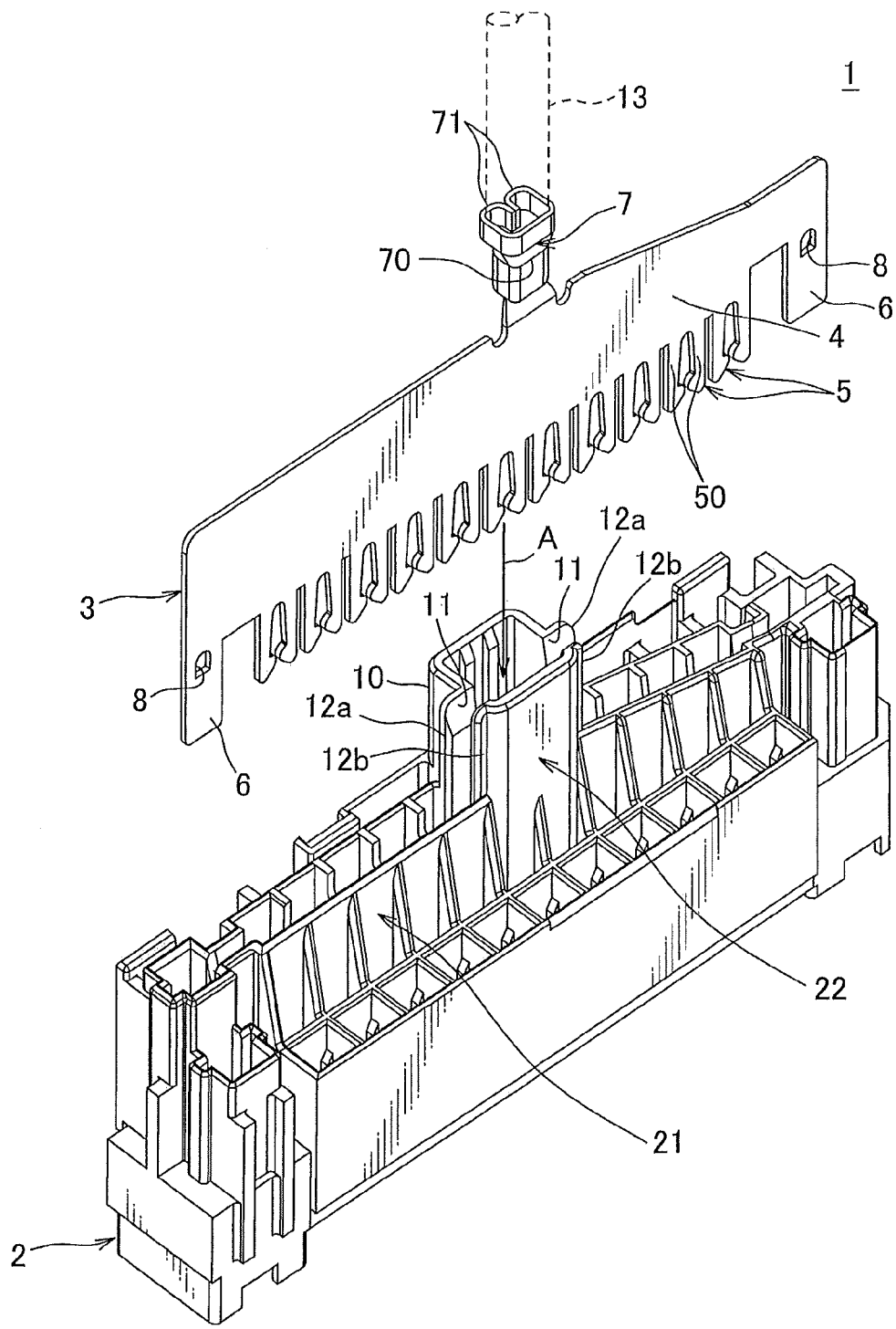
FIG. 1 is an exploded view illustrating an electric junction box according to one embodiment of the invention.
Figure 2:
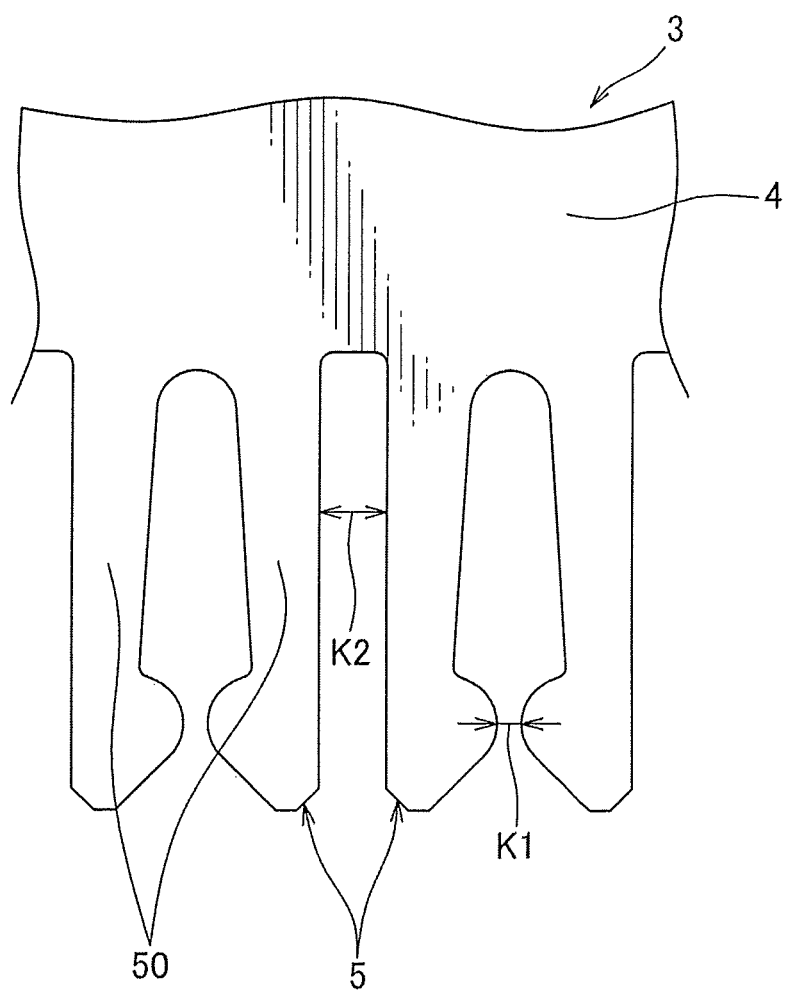
FIG. 2 is an enlarged view mainly illustrating the bus bar shown in FIG. 1.

As shown in FIG. 1, an electric junction box 1 is provided with a frame 2 made of synthetic resin, a bus bar 3 accommodated in the frame 2. The bus bar 3 is a wiring member for the electric junction box 1, which is made as by pressing metallic plate.

The bus bar 3 is provided with a plate 4 that forms horizontally long, a plurality of terminals 5 projecting from one end of the plate 4 in its short width direction, an electric wire crimped part 7 projecting from the other end of the plate 4 in its short width direction, a terminal protection part 6 projecting from both ends of the plate in its long width direction along the same direction as the terminal 5.

The terminal 5 includes a pair of holders 50 holding a mating connection member therebetween and is formed into tuning fork shape. In this embodiment the aforementioned connection mating member is a terminal of a fuse. The aforementioned electric wire crimped part 7 is provided with a bottom wall 70 positioning the electric wire 13 shown by the doted line in FIG. 1, a crimped piece 71 crimping a core wire of the electric wire 13. The electric wire 13 to be connected with the electric wire crimped part 7 is a power line through which large current flows. The aforementioned terminal protection part 6 includes a latched hole 8 formed in which a lance provided inside the frame 2 is latched.

The bus bar 3 as such is inserted into the frame 2 in the arrow A direction in FIG. 1 with the electric wire 13 being connected with the electric wire crimped part 7. Then the fuse is mounted in the electric component housing of the frame 2, and thus the terminal of the fuse is put into the pair of holders 50 of the terminal 5.

The frame 2 is provided with a first housing 21 accommodating the plate part 4, the plurality of terminals 5 and the terminal protection part 6, a second housing 22 projecting from an end of the first housing 21 and accommodating the electric wire crimped part 7, and a plurality of electric component housings and the like. The electric component housing in which the fuse is mounted is deposed in the end of the first housing 21 opposite to the second housing 22. Note that in FIG. 1 the frame 2 is shown in part.

The second housing 22 is provided with a quadrangular column peripheral wall 10, and a bite prevention walls 12a, 12b. Insides of the peripheral wall 10 and the first housing 21 are communicated. A pair of walls of the peripheral walls 10 opposite to each other is provided with slits 11 through which the bus bar 3 is passed when inserted into the frame 2. The bite prevention walls 12a, 12b upstand from both ends of the each slit 11 toward in an outside direction of the second housing 22.

Figure 3:
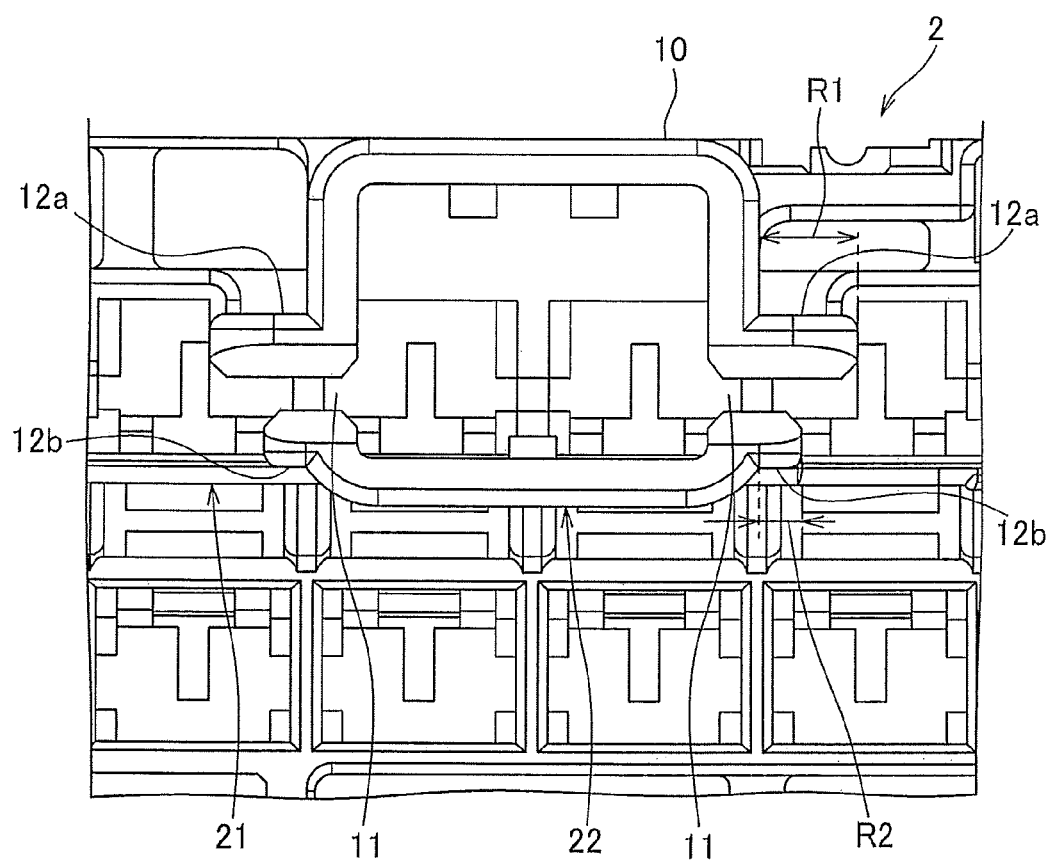
FIG. 3 is an enlarged view mainly illustrating the frame shown in FIG. 1.

In this embodiment an upstand length from the peripheral wall 10 of the one bite prevention wall 12a (R1 in FIG. 3) is formed larger than that of the other bite prevention wall 12b (R2 in FIG. 3). These upstand lengths of the bite prevention walls 12a, 12b from the peripheral wall 10 are formed larger than an interval between a pair of holders 50 of the terminal 5 (K1 in FIG. 2). Furthermore, these upstand lengths of the bite prevention walls 12a, 12b from the peripheral wall 10 are formed larger than an interval between the terminals adjacent to each other (K2 in FIG. 2).

As the embodiment, when the upstand lengths of the pair of bite prevention walls 12a, 12b opposite to each other from the peripheral wall 10 differ from each other, the shorter upstand length of the pair of bite prevention wall 12b is designed to be formed larger than the intervals between the pair of holders 50 of the terminal 5 and the terminals adjacent to each other. Namely, by "upstand length of the bite prevention wall from the peripheral wall" is defined a shorter one when the upstand lengths of the pair of bite prevention walls opposite to each other from the peripheral wall differ from each other.

According to the aforementioned electric junction box 1, the bus bar 3, when inserted into the frame 2, while in surface contact with the bite prevention walls 12a, 12b, is slid latterly as such, the bus bar 3 is thus inserted in position after alignment, the bus bar 3 is, therefore, smoothly inserted into the frame 2 without being stuck. Furthermore, since the upstand lengths of the bite prevention walls 12a, 12b from the peripheral wall 10 is arranged larger than the intervals between the pair of holders 50 of the terminal part 5 and the terminals 5 adjacent to each other, it is also made possible reliably to prevent the bite prevention walls 12a, 12b from being bitten between the pair of holders 50 and the terminals adjacent to each other, and smoothly to insert the bus bar 3 into the frame 2 without being stuck.

Figure 4:
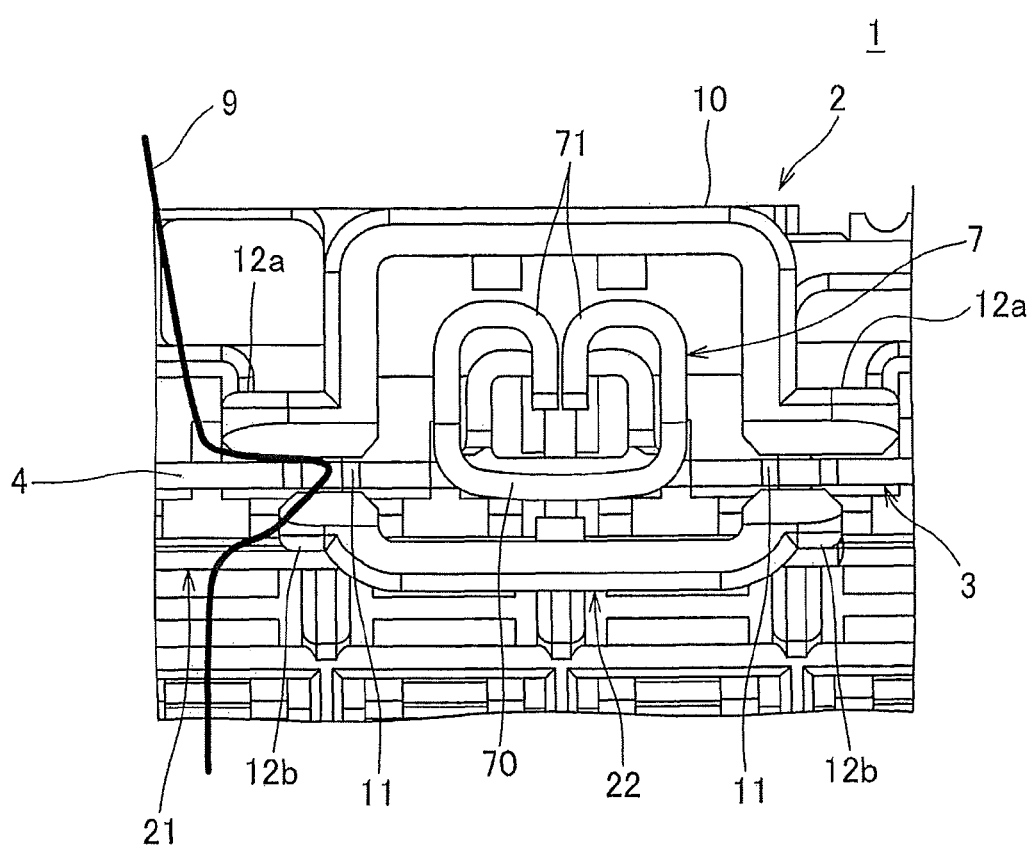
FIG. 4 is an explanatory view illustrating function and effect of the electric junction box shown in FIG. 1.

According to the aforementioned electric junction box 1, since the bite prevention walls 12a, 12b upstand from the both ends of the slit 11 of the peripheral wall 10 in the outside direction of the second housing 22, as shown in FIG. 4, even when the electric wire 9 enters into between the pair of bite prevention walls 12a, 12b, there remains distance from the bite prevention walls 12a, 12b to the electric wire crimped part 7 in the second housing 22, making it possible to prevent the electric wire 9 from contacting with the electric wire crimped part 7. It is thereby made possible to prevent the electric wire 9 from contacting with the electric wire crimped part 7, and the cover thereof from being torn to short. Note that the electric wire 9 differs from the electric wire 13 (not shown in FIG. 4, but see FIG. 1) connected to the electric wire crimped part 7.

Furthermore, according to the aforementioned electric junction box 1, provision of the bite prevention walls 12a, 12b allows for improvement of strength of the second housing 22.

Figure 5:
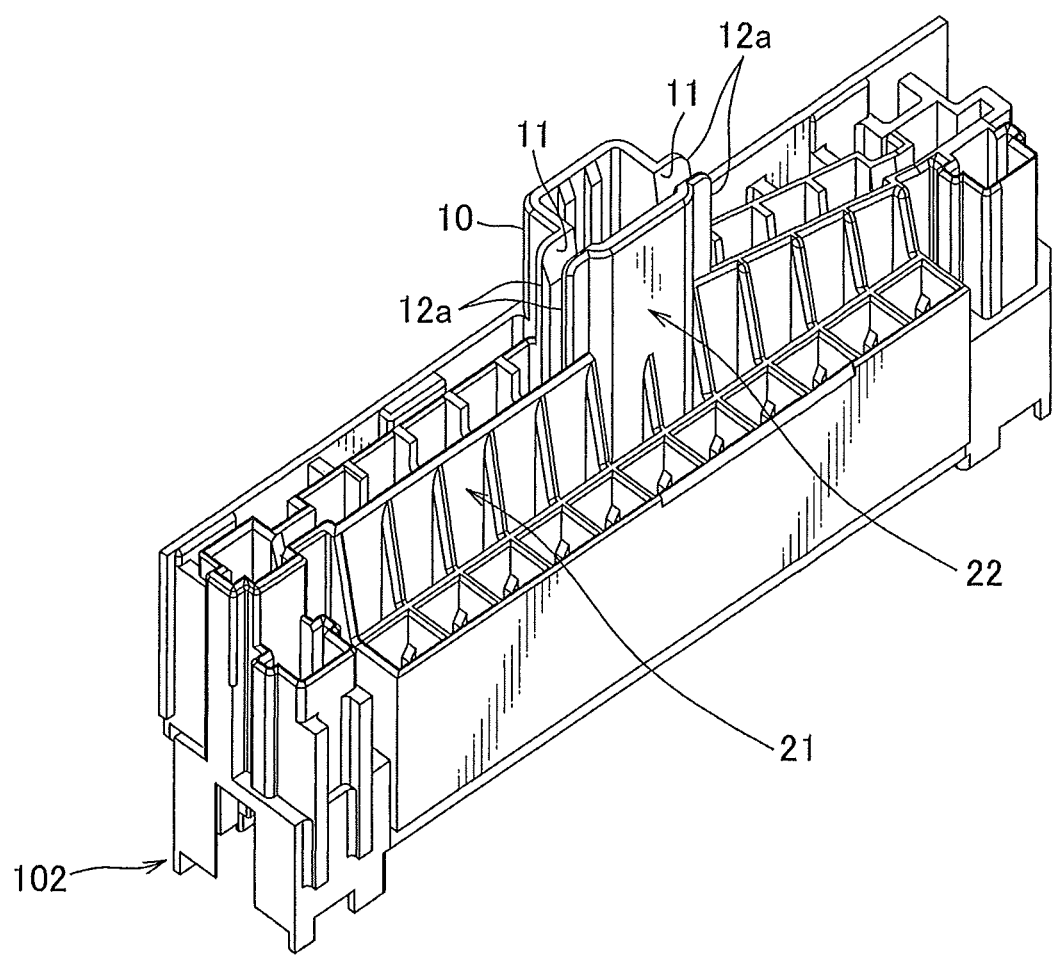
FIG. 5 is a perspective view illustrating modification of the frame shown in FIG. 1.
Figure 6:
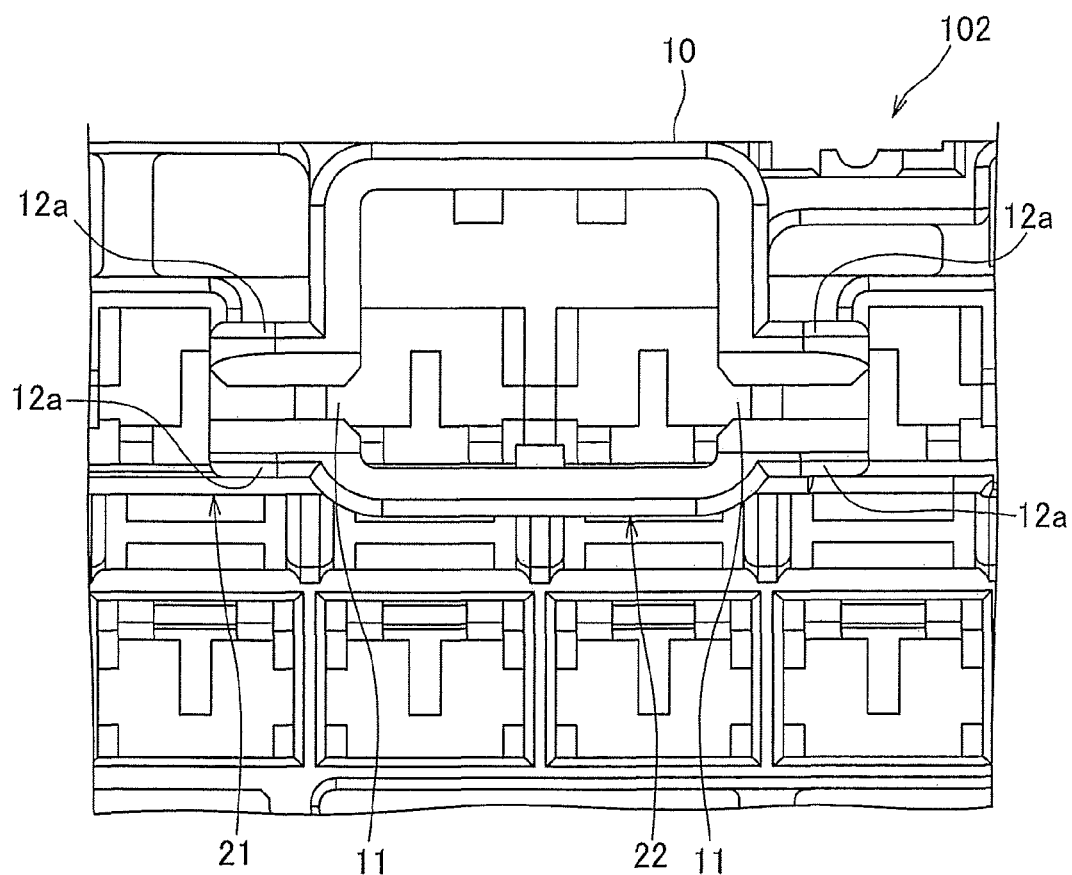
FIG. 6 is an enlarged view mainly illustrating the frame shown in FIG. 5.
Figure 7:
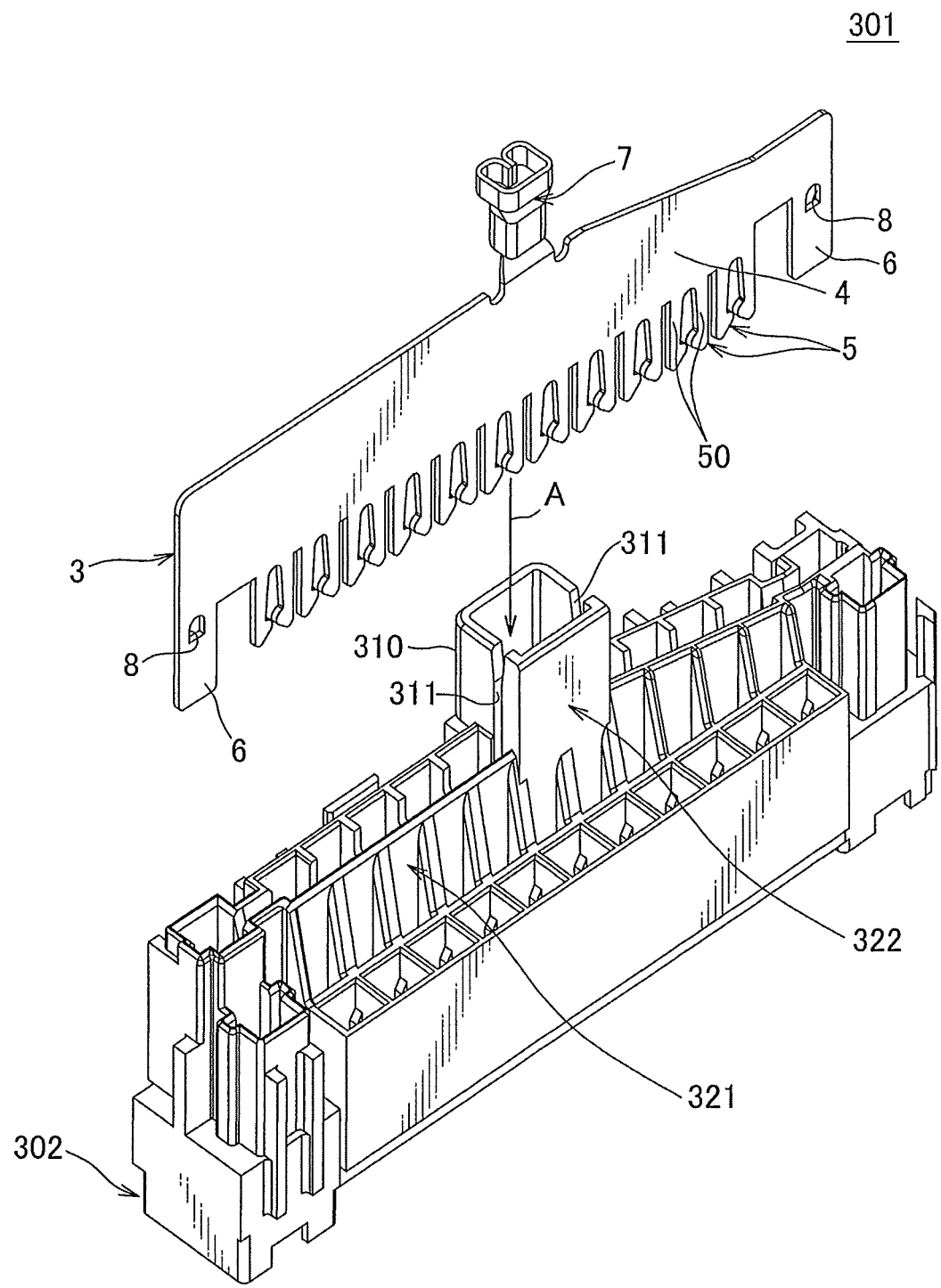
FIG. 7 is an exploded view of a conventional electric junction box.
Figure 8:
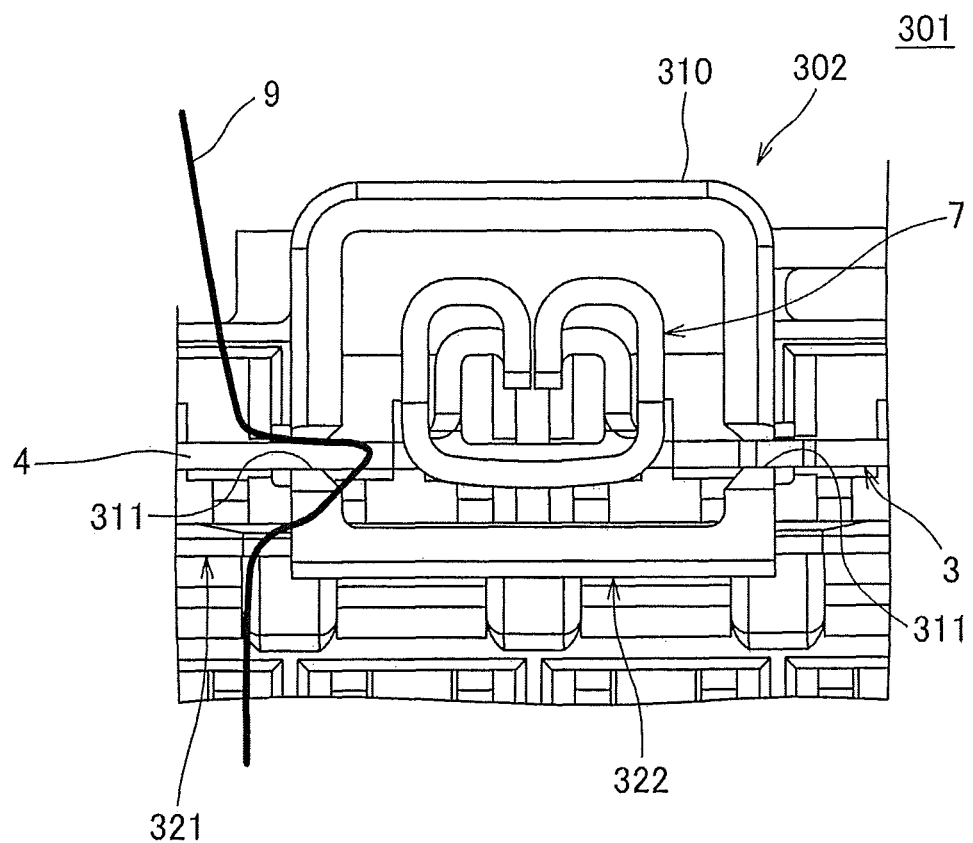
FIG. 8 is an explanatory view illustrating drawback of the electric junction box shown in FIG. 7.

Furthermore, in the present embodiment, while the upstand length of the one bite prevention wall 12a from the peripheral wall 10 is formed larger than that of the other opposite bite prevention wall 12b, a pair of bite prevention walls 12a, 12b which upstand lengths are the same as the frame 102 shown in FIGS. 5 and 6 may be disposed on both sides of the slit 11. Note that FIG. 5 shows the frame 102 in part.

Note that the aforementioned embodiments merely show such as, but not limited to, typical embodiment of the present invention. Namely, it is to be understood that various changes and modifications will be apparent to those skilled in the art. Therefore, unless otherwise such changes and modifications depart from the scope of the present invention hereafter defined, they should be construed as being included therein.

REFERENCE SIGNS LIST 1 electric junction box
2, 102 frame
3 bus bar
4 plate
5 terminal
7 electric wire crimped part
10 peripheral wall
12a, 12b bite prevention wall
21 first housing
22 second housing

The invention claimed is:

1. An electric junction box, comprising:
   a bus bar including
      a plate part,
      a plurality of terminals projecting in parallel with each other from one end of the plate, and
      an electric wire crimped part projecting from the other end of the plate; and
   a frame accommodating the bus bar and including
      a first housing accommodating the plate part and the plurality of terminals, and
      a second housing projecting from an end of the first housing and accommodating the electric wire crimped part, the second housing including
         a tubular peripheral wall composing the second housing and being provided with a slit passing the bus bar therethrough upon the bus bar being inserted into the frame, and a bite prevention wall upstanding from both sides of the slit in an outward direction of the second housing.

2. The electric junction box as claimed in claim 1, wherein an upstand length of the bite prevention wall from the peripheral wall is arranged larger than an interval between the terminals adjacent to each other.

3. The electric junction box as claimed in claim 1, wherein the terminals include a pair of holders holding a connection mating member therebetween and are formed into tuning fork shape, and wherein an upstand length of the bite prevention wall from the peripheral wall is arranged larger than an interval between the pair of holders.

4. The electric junction box as claimed in claim 3, wherein the upstand length of the bite prevention wall from the peripheral wall is arranged larger than an interval between the terminals adjacent to each other.

* * * * *